United States Patent [19]

Buck

[11] 4,323,606

[45] Apr. 6, 1982

[54] CONJUGATED DIENE/MONOVINYL AROMATIC COPOLYMER-BASED HEAT CONTRACTIBLE FILM COATINGS ON GLASS BOTTLE

[75] Inventor: Ollie G. Buck, Bartlesville, Okla.

[73] Assignee: Phillips Petroleum Company, Bartlesville, Okla.

[21] Appl. No.: 107,793

[22] Filed: Dec. 27, 1979

Related U.S. Application Data

[62] Division of Ser. No. 917,440, Jun. 20, 1978, abandoned.

[51] Int. Cl.$^3$ .................................................. B05D 3/06
[52] U.S. Cl. .................................... 428/35; 215/12 R
[58] Field of Search ................. 525/241, 273; 428/35; 215/12 R

[56] References Cited

U.S. PATENT DOCUMENTS

| | | | |
|---|---|---|---|
| 2,975,160 | 3/1961 | Zelinski | 260/876 B |
| 3,030,346 | 4/1962 | Cooper | 260/876 B |
| 3,178,049 | 4/1965 | Cottet | 260/894 |
| 3,251,905 | 5/1966 | Zelinski | 260/876 B |
| 3,281,383 | 10/1966 | Zelinski et al. | 260/876 B |
| 3,325,575 | 6/1967 | Last | 260/894 |
| 3,427,789 | 2/1969 | Emus | 260/894 |
| 3,460,951 | 8/1969 | Heyl | 260/894 |
| 3,639,517 | 2/1972 | Kitchen et al. | 260/876 B |
| 3,950,199 | 4/1976 | Lucas | 156/86 |
| 4,086,373 | 4/1978 | Tobias et al. | 427/44 |
| 4,133,923 | 1/1979 | Blunt | 428/35 |
| 4,260,066 | 4/1981 | Hannon et al. | 428/35 |

OTHER PUBLICATIONS

Hassell, "Producing Ionomer-Coated Bottles", Plastics Technology, Aug. 1977, pp. 59-63.

*Primary Examiner*—William R. Dixon, Jr.

[57] ABSTRACT

A blend of at least two conjugated diene/monovinyl aromatic copolymers, having the herein specified diene-to-aromatic ratios has been applied as a heat-contractible, flexible coating on objects, e.g., glass bottles.

4 Claims, No Drawings

CONJUGATED DIENE/MONOVINYL AROMATIC COPOLYMER-BASED HEAT CONTRACTIBLE FILM COATINGS ON GLASS BOTTLE

This is a divisional application of Ser. No. 917,440, filed June 20, 1978 now abandoned.

This invention relates to breakable bottle coating. In one of its aspects it relates to coated breakable bottles, e.g., bottles made of glass, to prevent scattering of fragments should the bottle be shattered.

In one of its concepts the invention provides upon a breakable bottle, e.g., a glass bottle, a coating essentially composed of a conjugated diene/monovinyl aromatic copolymer. In another of its concepts the invention provides a breakable bottle, e.g., a glass bottle, coated with a conjugated diene/monovinyl aromatic copolymer containing film. In a still further concept of the invention it provides a coating composed of a blend of copolymers having utility when applied to, say, a glass bottle as a flexible protective coating for the bottle to prevent scattering of glass fragments in the event the glass of the bottle is broken.

One skilled in the art in possession of this disclosure having studied the same will recognize that the coating materials herein described have wide applicability for coating various objects which can be delicate or not as the case may be. Various frangible or breakable objects are known. Further, objects which are to be coated and which can be distorted or otherwise affected, even though not necessarily broken into pieces, are protected with suitable coatings.

The invention will now be described in connection with an embodiment thereof relating to the coating of glass or other breakable containers or bottles.

In recent years the trend in the beverage bottling industry has been to larger containers. At the same time, more soft drinks have been bottled in thinner walled, more fragile, non-returnable glass containers. This combination has resulted in greater potential danger to the consumer from flying glass fragments when the filled containers are accidentally broken.

One approach used to solve this problem is encapsulation of the glass bottle with a fragment retention coating such as a plastic or a rubber. Encapsulation of glass bottles also allows the bottle manufacturer to produce thinner, lighter bottles with reduced shipping costs and less energy consumption.

Commercial materials currently used as fragment retention coatings are: (a) polyvinyl chloride, applied generally as a plastisol; (b) foam polyethylene, applied as a shrink film with the neck portion of the bottle hot melt coated; and (c) ionomer polymers applied as an electrostatic powder coating. All of these materials have certain drawbacks: (a) polyvinyl chloride because of possible difficulty with the Food and Drug Administration (FDA) regulations; (b) foam polyethylene because the material is opaque which is undesirable and (c) ionomer polymers because of initial cost, high energy consumption and low electrostatic powder coating rates. Hence, the need exists for a fragment retention glass bottle coating that is transparent, capable of high speed application, and complies with FDA regulations.

It is an object of this invention to provide a fragment retaining coating upon a breakable object, e.g., a glass bottle or container. A further object of the invention is to provide a coated frangible container or bottle.

Other aspects, concepts, objects and the several advantages of the invention are apparent from a study of this disclosure and the appended claims.

According to the present invention a blend of two conjugated diene/vinyl aromatic copolymers is applied by a heating technique to the external surface of, say, a glass beverage bottle, by causing the blend in the form of a film to contract responsive to applied heat to snugly encapsulate the bottle.

Thus, there is provided a transparent film which is comprised of a blend of the two copolymers, the film being formed by a heat contracting technique, at least upon an external surface of a bottle or container to prevent excessive shattering and consequent scattering of fragments when the bottle is broken accidentally or otherwise.

Further, according to the invention, the heated contractible film which is transparent and which is useful in this invention is comprised of a blend of two conjugated diene/monovinyl aromatic copolymers which can be represented by the formulas

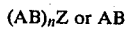

$(AB)_nZ$ or AB wherein A is a poly(monovinyl aromatic) segment, B is a poly(conjugated diene), Z is a polyfunctional coupling residue or polyfunctional initiator residue and $n=2$ to 4.

The first copolymer of the blend, referred hereafter as Copolymer I is generally comprised of a larger amount of poly(monovinylaromatic) than poly(conjugated diene) and as such contributes mostly to strength and rigidity of the film whereas the second copolymer of the blend, referred to hereafter as Copolymer II is generally comprised of a larger amount of poly(conjugated diene) than poly(monovinyl aromatic) and as such contributes mostly to flexibility and elasticity.

Examples of the monovinyl aromatic monomers used in either copolymer include styrene, 1-vinylnaphthalene, 2-vinylnaphthalene and the alkyl, cycloalkyl, aryl, alkaryl and aralkyl derivatives thereof in which the total number of carbon atoms in the combined substituents is generally not greater than 12. Examples of such substituted monomers include: 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and the like.

Examples of the conjugated diene monomers used in either copolymer include 1,3-butadiene, isoprene, 2,3-dimethyl-1,3-butadiene, piperylene, 3-butyl-1,3-octadiene, 1-phenyl-1,3-butadiene and the like.

Both copolymers, Type I or II, can be linear or branched (i.e., radial) block or random copolymers and must contain at least 5 wt. % olefinic unsaturation because fully saturated copolymers do not form satisfactory films for the heat contractible process of the invention.

Copolymer Type I can contain a conjugated diene/monovinyl aromatic ratio ranging from about 20/80 to about 50/50. The copolymer used in this invention corresponding to copolymer I was K-Resin ® (Phillips Petroleum Company) the preparation of which is described in U.S. Pat. No. 3,639,517. U.S. Pat. No. 3,251,905 and 3,030,346 are also referenced as methods of preparing branched polymers of the invention using polyfunctional initiators. The physical properties of Copolymer I are shown in Table I.

TABLE I

| Physical Properties of Copolymer I | |
| --- | --- |
| 1. Butadiene/Styrene, wt. % Ratio (K-Resin) | 24/76 |
| 2. Weight Average Molecular Weight/Number Average Molecular Weight, $M_w/M_n$ | 179,000/95,000 |
| 3. % Elongation (ASTM D638) | 100 |
| 4. Tensile Strength, psi (ASTM D638) | 4000 |
| 5. Light Transmission, % | 90-95 |
| 6. Structure | Branched (radial block) |

Copolymer II can contain a conjugated diene/monovinyl aromatic ratio ranging from about 50/50 to about 90/10. The copolymer used in this invention corresponding to copolymer II was Solprene® 410 (Phillips Petroleum Company), the preparation of which is generally described in U.S. Pat. No. 2,975,160. The physical properties of Copolymer II are shown in Table II.

TABLE II

| Physical Properties of Copolymer II (Solprene 410) | |
| --- | --- |
| 1. Butadiene/Styrene, wt. % Ratio | 52/48 |
| 2. Weight Average Molecular Weight/Number Average Molecular Weight, $M_w/M_n$ | 101,000/57,000 |
| 3. % Elongation (ASTM D412-68) | 610 |
| 4. Tensile Strength, psi (ASTM D412-68) | 2750 |
| 5. Structure | Random-block |

Copolymer I and Copolymer II can be blended by any convenient method such as melt blending the ingredients in an appropriate mixer like a Banbury or a Farrel mixer/extruder or by solution blending. The preferred method is solution blending of the polymer cements (solutions) with subsequent solvent evaporation and solid recovery. This latter method has the advantage in that the polymers are originally prepared in solution (cements) and the process would eliminate one drying step. The ratios of Copolymer I to Copolymer II useful in this invention are shown below:

| | Wt. Percent | |
| --- | --- | --- |
| | Broad | Preferred |
| Copolymer I | 99-25 | 90-50 |
| Copolymer II | 1-75 | 10-50 |

ADDITIVES AND FILLERS

Other additives can be added to improve performance properties as required. For example, stabilizers can be added to improve resistance to oxidation and ultraviolet light. Other additives can be added such as stearyl amide to improve lubricity, stearic acid to improve processability, oils and waxes to improve printability and antiblocking characteristics, etc. Fillers such as carbonates, silicates, etc., can be added when transparency is not required.

FDA COMPLIANCE

Copolymer I (K-Resin) used in this invention complies with FDA Regulation Section 177.1640 (Title 21 Code of Federal Regulations). It also meets requirements of FDA Regulation 121.2510 and, thus, may be used in contact with food or food products.

Copolymer II (Solprene 410) used in this invention complies with FDA Regulation Section 177.1810 for styrene block copolymers. It can be used with all non-alcoholic and non-fatty foods.

Generally speaking, when dealing with foods, as known, laws and regulations designed to protect the health of human and other animals must be completed with.

HEAT CONTRACTIBLE FILM

When the heat contractible film described herein is used for application to glass bottles, the film thickness should be at least 2 mils, (0.0051 cm). For other type applications, such as packaging, less than 2 mil thick film would be satisfactory. The film can be prepared as a blown film or extruded sheets, but in either case, it must be monaxially oriented so that when the film is applied to the desired object, contraction will be mostly in one direction. For long tubular shaped objects, film orientation is preferred to be transverse to the long axis of the object to be coated.

Besides bottle coatings, the present invention can also be used in other film coatings such as blister packaging, food packaging (in accordance with specific FDA regulations) and similar type packaging and coating.

The following examples serve to illustrate the operability of this invention.

EXAMPLE I

A 1.89 liter (64 oz.) precleaned glass bottle (11.72 cm., 4.62 in. diamter ×29.85 cm., 11.75 in.) was filled to within 2.5-5.1 (1-2 in.) of the top with water, pressurized to 0.414 MPa (60 psig) with carbon dioxide and the bottle capped. The filled pressurized bottle was then dropped with a height of 1.22 meters (4 feet) onto the surface of a steel plate resting on concrete. The percentage of glass fragments remaining within a 0.914 meter (3 foot) diamter circle around the point of impact was determined to be 15.1%. A value of 95% or better is considered acceptable for fragment retention.

EXAMPLE II

A commercial 1.89 liter (64 oz.) beverage bottle containing a 19 mil thick external coating of foamed polystyrene over all but the neck portion of the bottle was filled with water and tested in the same manner as described in Example I. The glass fragment retention was determined to be 34.4%.

EXAMPLE III

A 1.89 liter (64 oz.) precleaned glass bottle (11.72 cm., 4.62 in. diameter ×29.85 cm., 11.75 in.) was wrapped with a 5.5 mil thick cylindrical film comprised of 74.6 wt. % Copolymer I, 24.9 wt. % Copolymer II, and 0.5 wt. % U.V. light stabilizer (Tinuvin[R]P). The film was approximately 11.93 cm (4.695 in.) diameter ×21.59 cm. (8.5 in.) with about a 1 cm. longitudinal overlap and was wrapped around the bottle in such a maner that only the neck of the bottle remained uncoated. The glass bottle with the loose film covering was placed in a 125° C. oven until the tubular film conformed to the bottle shape, usually about 3-10 mins. The coated bottle was cooled to ambient room temperature and filled with water and tested in the same manner as described in Example I. The glass fragment retention was determined to be 86.3%.

EXAMPLE IV

The coating procedure as described in Example III was repeated except the neck portion of the bottle was pre-treated with a 20 wt. % toluene solution of the same coating. The neck was dipped two or three times, with drying between each coat, to build up the same approximate thickness as the heat shrinkable coating which was subsequently applied. The fully coated bottle was filled and tested in the same manner as previously described. A 96.6% glass fragment retention was obtained. The test was repeated except the coated bottle was pre-exposed to Weatherometer conditions (50% relative humidity, periodic water spray, 60° C., Xenon lamp U.V. light) for 75 hours. After filling and testing in the same manner as previously described, a 99.0% glass fragment retention was obtained suggesting no detectable polymer degradation and showing that the coating provides adequate protection even after severe exposure. In addition, the color and clarity of the film was not altered after the exposure.

EXAMPLE V

Films comprised only of Copolymer I are difficult to apply by the heat contractible method to the external surface of glass bottles because the films are brittle and lack the flexibility to provide adequate glass fragment retention. To illustrate this point, a 20 wt. % toluene solution of Copolymer I was applied to a 64 oz. glass bottle (5 mil thickness) and tested in the manner previously described. A glass fragment retention of 74.0% was obtained. Likewise, a 20 wt. % toluene solution of the inventive coating, 75 wt. % Copolymer I and 25 wt. % Copolymer II (no U. V. stabilizer added), was applied to a 64 oz. glass bottle and tested in like manner to give a 96.7 wt. % glass fragment retention. From these two values and the glass fragment retention value of the inventive coating applied as a heat contractible film in Example III, a glass fragment retention value of 74.6% can be calculated for Copolymer I applied as a heat contractible film.

SUMMARY

Table III summarizes the current invention and illustrates the outstanding effectiveness of the inventive coating when used as a heat contractible film on glass bottles to prevent excessive glass fragment scattering when accidentally dropped.

TABLE III

| | Summary | | |
|---|---|---|---|
| Bottle Coating | Example No. | Coating Thickness, mils | Glass Fragment Retention,[a] % in a 0.914M (3 ft.) Circle |
| 1. None | I | — | 15.1 |
| 2. Commercial Foamed Polystyrene | II | 19 | 34.4 |
| 3. 75 Wt. % Copolymer I/25 wt. % Copolymer II | III | 5.5 | 86.3 |
| 4. 75 Wt. % Copolymer I/25 wt. % Copolymer II[b] | IV | 5.5 | 97.6 |
| 5. 75 Wt. % Copolymer I/25 wt. % Copolymer II[b,c] | V | 5.5 | 99.0 |

[a] A value of 95% is considered acceptable.
[b] Neck portion solution coated
[c] After 75 hours weatherometer exposure.

The portion represented by Copolymer II can be comprised of one, two or more similar type copolymers such that the combined diene-vinyl aromatic ratio falls within the desired range. For example, a 50:50 mixture of two copolymers having 55/45 and 75/25 conjugated diene/vinyl aromatic ratios respectively would result in a combined total conjugated diene/vinyl aromatic ratio of 65/35.

Likewise, the portion represented by Copolymer I can also be comprised of one, two or more similar type copolymers such that the combined diene/vinyl aromatic ratio falls within the desired range. For example, a 50:50 mixture of two copolymers having a 25/75 and 45/55 conjugated diene/vinyl aromatic ratio respectively would result in a combined total conjugated diene/vinyl aromatic ratio of 35/65.

Thus, it can be seen that at least two and possibly more than two copolymers can be used in the present invention.

One skilled in the art of preparation of copolymers such as are herein described and here discussed having studied this disclosure will recognize that variations in properties of a copolymer will not necessarily or always vary in a linear or straight line relationship with change in monomer ratio. Mere routine testing can determine optimum ratios and amounts of each of the copolymers to be blended. This is so whether two or more copolymers of Types I and II are to be blended. The properties which initially are to be determined for any specific copolymer and of a final blend of copolymers will, of course, include those earlier mentioned, namely, rigidity, flexiblity, and where specifically important, degree of transparency and light transmission.

Reasonable variation and modification are possible within the scope of the foregoing disclosure and the appended claims to the invention the essence of which is that there has been provided a conjugated diene/monovinyl aromatic copolymer containing film or coating on various objects as described, the coating being particularly effective to prevent the scattering of fragments of frangible or breakable containers or bottles, for example, made of glass.

I claim:

1. A coated object said object having been coated by a coating contracting operation in which a coating applied comprises essentially a blend of a conjugated diene/monovinyl aromatic copolymer having the ratio of conjugated diene to vinyl aromatic of from about 20/80 to about 50/50 Copolymer I and a conjugated diene/monovinyl aromatic copolymer having a conjugated diene/monovinyl aromatic ratio ranging from about 50/50 to about 90/10 Copolymer II each said copolymer having at least about 5 wt. % olefinic unsaturation said Copolymer I being represented by the formula $(AB)_nZ$ or AB and said Copolymer II being represented by formula AB wherein A is a polyvinyl aromatic segment, B is a polyconjugated diene, Z is a polyfunctional coupling residue or polyfunctional initiator residue and n is an integer in the range 2 to 4, wherein Copolyer I is present in the approximate range of 90-50 and Copolymer II is present in the approximate range of 10-50, by weights percent.

2. A coated object according to claim 1 wherein the conjugated diene is butadiene and the monovinyl aromatic is styrene and the wt. % ratio of monomers in Copolymer I is approximately 24/76, the weight average molecular weight/number average molecular weight is 179,000/95,000.

3. A coated object according to claim 1 wherein the object is a frangible glass container.

4. A coated object according to claim 1 wherein the object is made of a frangible material.

* * * * *

UNITED STATES PATENT AND TRADEMARK OFFICE
CERTIFICATE OF CORRECTION

PATENT NO. : 4,323,606
DATED : April 6, 1982
INVENTOR(S) : Ollie G. Buck

It is certified that error appears in the above-identified patent and that said Letters Patent are hereby corrected as shown below:

Column 6, line 45, "50/50 Copolymer" should be ---50/50 in Copolymer---.

Column 6, line 48, "90/10 Copolymer" should be ---90/10 in Copolymer---.

Column 6, line 56, "90-50 and" should be ---90-50 wt. % and---.

Column 6, lines 57 and 58, "10-50, by weights percent" should read ---10-50 weight percent, and the copolymers are selected so that Copolymer I contains a larger amount of poly(monovinyl aromatic) than poly(conjugated diene) and Copolymer II contains a larger amount of poly(conjugated diene) than poly(monovinyl aromatic)---.

Column 6, line 63, "weight is 179,000/95,000" should read ---weight is 179,000/95,000 and the wt. % ratio of the monomers in Copolymer II is approximately 52/48, the weight average molecular weight/number average molecular weight is 101,000/57,000---.

Signed and Sealed this

Seventeenth Day of August 1982

[SEAL]

Attest:

*Attesting Officer*

GERALD J. MOSSINGHOFF
*Commissioner of Patents and Trademarks*